(12) United States Patent
Yang (10) Patent No.: US 8,149,159 B1
(45) Date of Patent: Apr. 3, 2012

(54) RADAR COASTING DURING DATA DROPOUT

(75) Inventor: Robert E. Yang, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 714 days.

(21) Appl. No.: 12/250,207

(22) Filed: Oct. 13, 2008

(51) Int. Cl.
*G01S 13/00* (2006.01)
(52) U.S. Cl. ............... 342/76; 342/95; 342/107; 342/99
(58) Field of Classification Search .................. 342/76, 342/95, 99, 107
See application file for complete search history.

(56) References Cited

U.S. PATENT DOCUMENTS 4,783,744 A * 11/1988 Yueh .............................. 701/221

* cited by examiner

*Primary Examiner* — Timothy A Brainard
(74) *Attorney, Agent, or Firm* — Howard IP Law Group, PC (57) ABSTRACT

A method for rapid convergence of radar target state includes the steps of using range acceleration to estimate perpendicular velocity and jump-starting a Cartesian state filter with the estimated perpendicular velocity. The improved estimate in the Cartesian state filter allows improved coasting of the range-state.

16 Claims, 6 Drawing Sheets

RADAR COASTING DURING DATA DROPOUT

GOVERNMENTAL INTEREST

This invention was made with Government support under contract number HQ0006-05-D-0003 awarded by the Department of the Navy. The Government has certain rights in this invention.

BACKGROUND OF THE INVENTION

Figure 1:
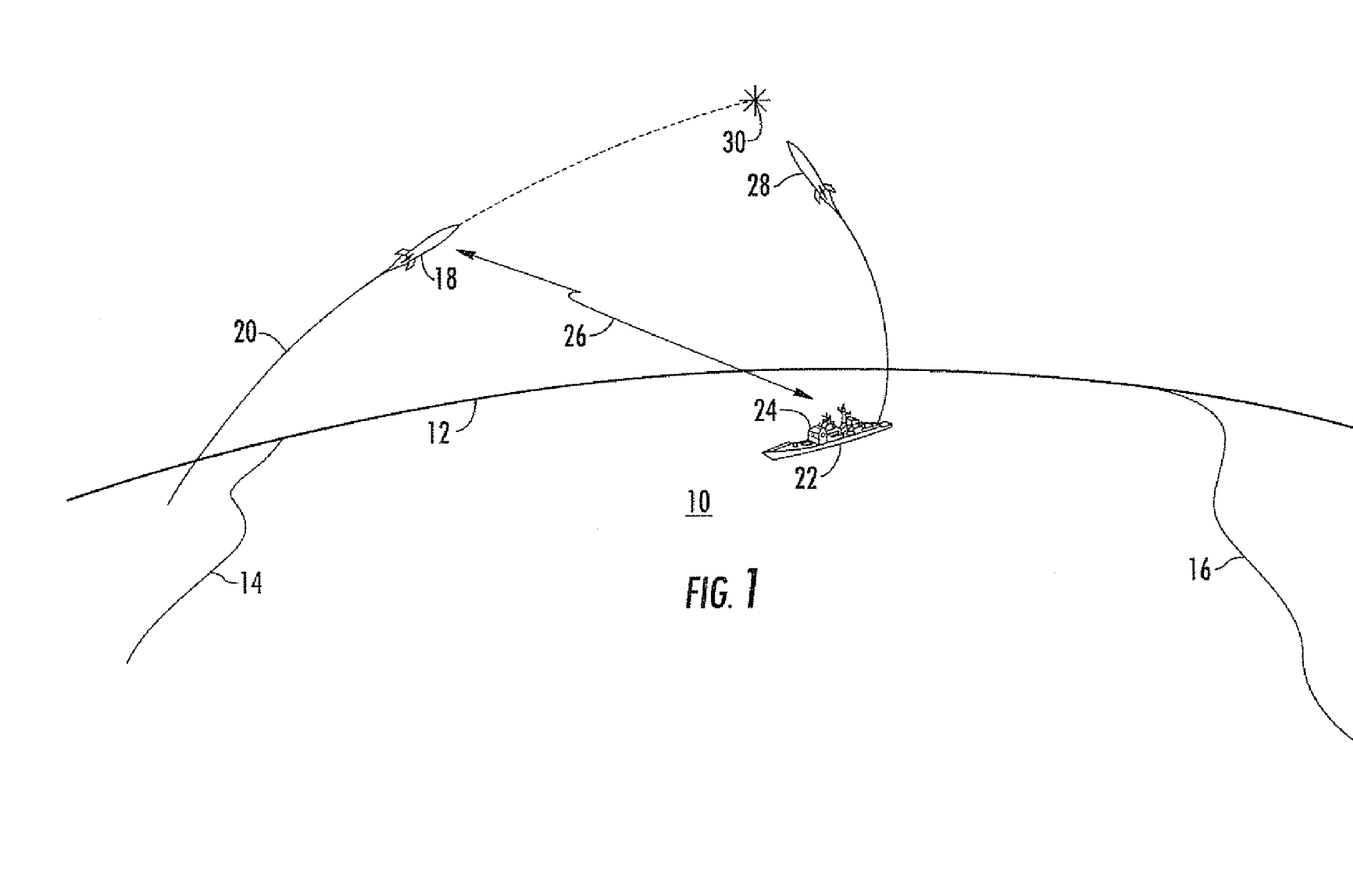
FIG. 1 is a simplified scenario illustrating a portion of the Earth's surface including land masses and water regions, a target and a ship equipped with a radar.

FIG. 1 is a simplified diagram illustrating a portion 10 of the Earth's surface, a horizon 12, and first and second land masses 14 and 16. A hostile missile 18 has been launched from land mass 14 and has taken a path 20 to its current location. A friendly ship 22 bears a radar system designated generally as 24. It will be understood that the radar system 24 may as well be land-based rather than ship-based. Radar 24 senses missile 18 by means of electromagnetic radiation illustrated by a conventional "lightning bolt" symbol 26.

Figure 2:
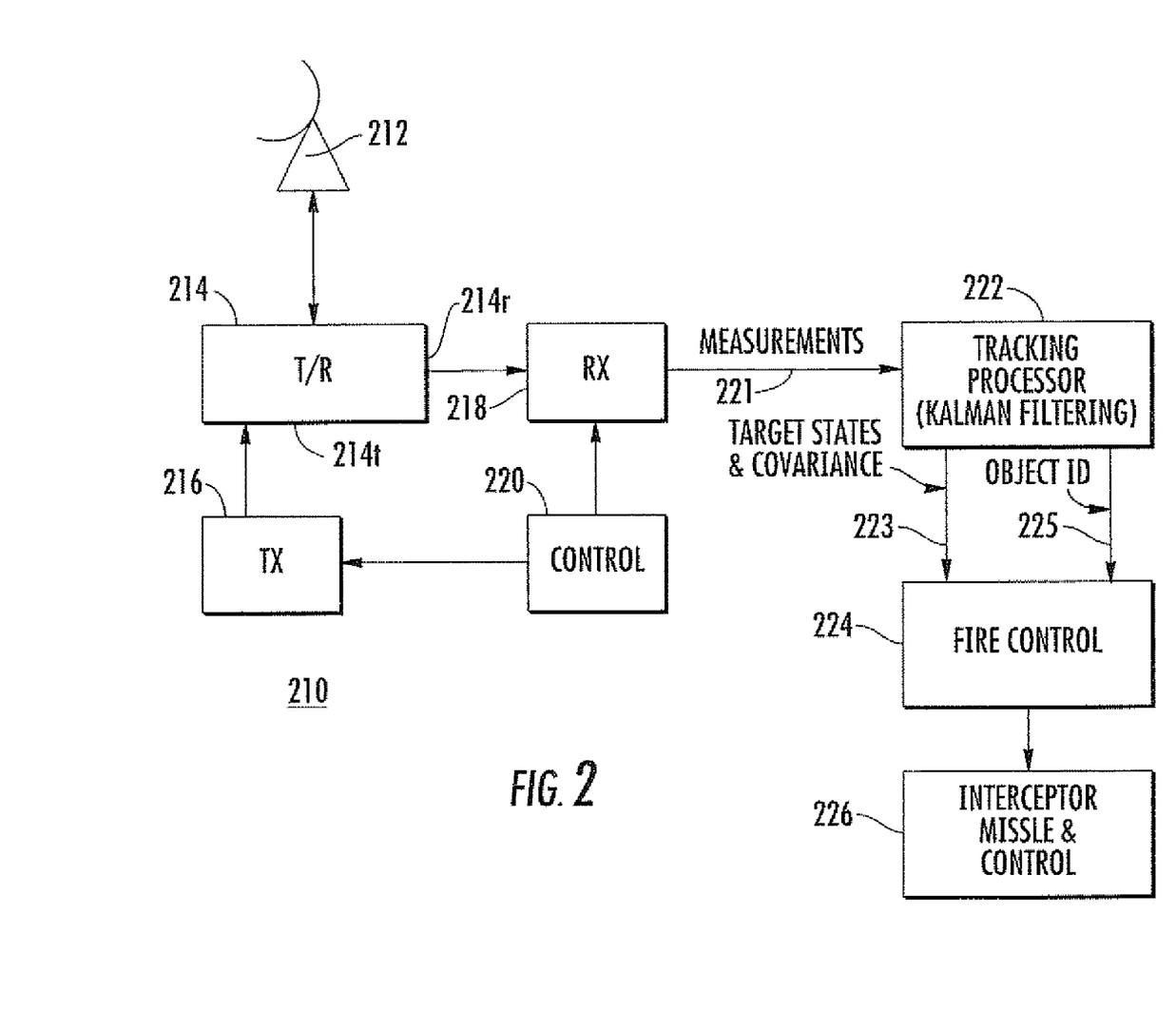
FIG. 2 is a simplified block diagram of radar and fire control processing related to the radar of FIG. 1.

FIG. 2 is a simplified block diagram illustrating a radar system 210 which may be used in radar 24 of FIG. 1. In FIG. 2, an antenna illustrated as 212 is connected to a transmit/receive element (T/R) illustrated as a block 214. A transmitter (TX) 216 is coupled to the transmit input port 214t of T/R 214, and a receiver (RX) illustrated as a block 218 is connected to receive signal port 214r of T/R 214. A radar controller 220 at least synchronizes the transmitter and receiver, all as well known in the art.

The received signals from receiver 218 are coupled by way of a path 221 to a tracking processor 222. Processor 222 processes the measurements of the target, and generates time-sequences of estimated target location, which are known as tracks or target tracks. The target tracks are continuously updated with current measurements and extrapolated to estimated future locations of the target. The results of this processing are estimated future target states and covariance. The estimated future target states and covariance are provided by way of a path 223 to a fire control system illustrated as a block 224. Fire control block 224 selects countermeasures appropriate to the threat and its state, and initiates the countermeasures, as by initiating control of an interceptor missile. The fire control information is provided to an interceptor missile and/or its controller, as suggested by block 226. An appropriate countermeasure is made, as by launch of an interceptor missile 28 of FIG. 1 and guidance of the interceptor to an intercept point 30 with the hostile missile 18.

The system of FIGS. 1 and 2 relies on a stream of measurement data from the sensors, which in the illustrated scenario includes a radar system. The measurement data is a stream or time sequence $(t_1, t_2, \ldots, t_{N-1}, t_N, t_{N+1}, \ldots t_K)$ of range, range-rate, and azimuth and elevation angle measurements. The stream of data is subject to dropouts and the effects of target maneuvers, which degrade the performance of the various filters used to estimate the target location, and also tends to degrade the discrimination among various types of objects being tracked. This is particularly true in those cases in which the target separates into multiple objects, such as booster, decoys, and payload.

Figure 3:
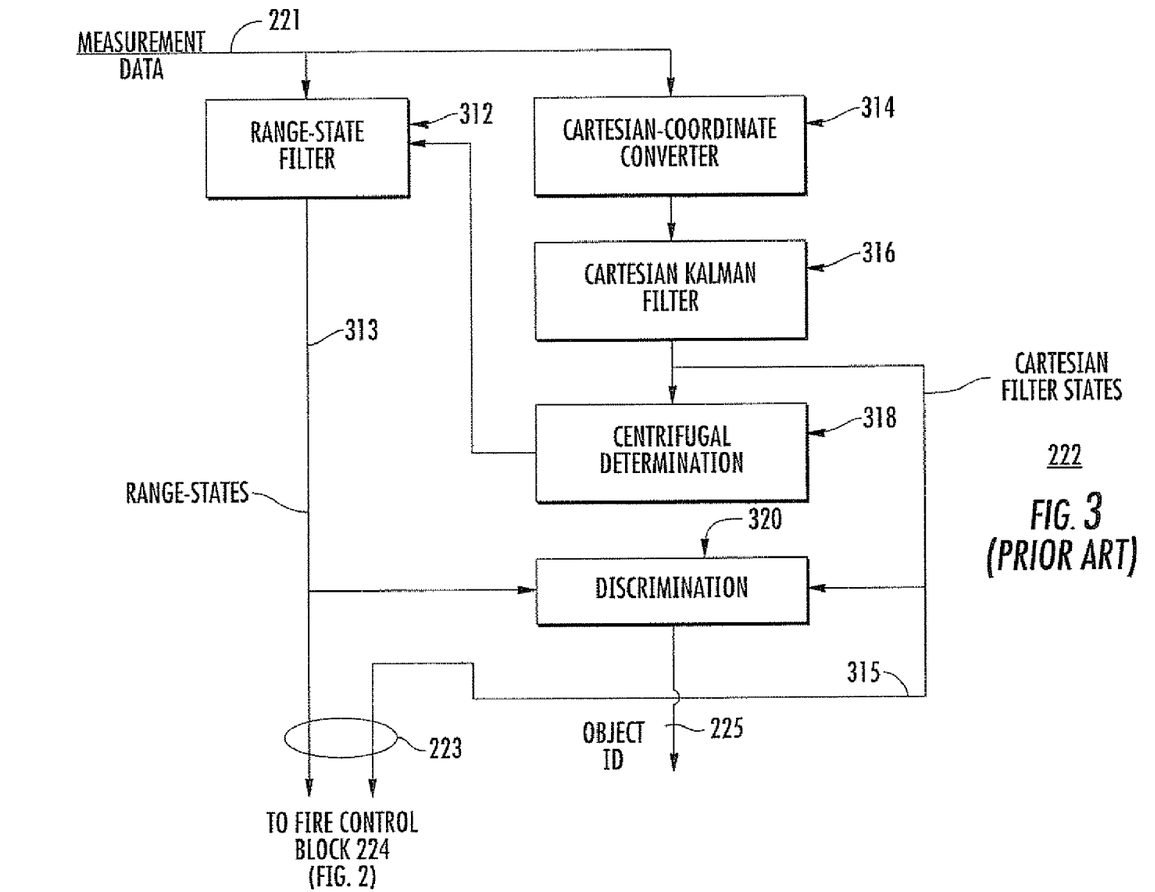
FIG. 3 is a simplified block diagram of a prior-art radar processing arrangement which can be used in the arrangement of FIG. 2.

FIG. 3 is a simplified block diagram 310 of a prior-art tracking processor 222 of FIG. 2. In FIG. 3, the received measurement is applied from path 221 in common for in parallel) to range-state filter 312 and to a Cartesian coordinate converter illustrated as a block 314. Range-state $\vec{r}$ includes r, $\dot{r}$, and $\ddot{r}$ that is range, and its time derivatives. Converter 314 converts the measurement data, expressed in terms of range, range rate, azimuth angle, and elevation angle, into (ship-based) Cartesian X,Y,Z coordinates using well-known spherical-coordinate-to-Cartesian-coordinate transformations. The Cartesian-coordinate information is also termed "3-D" information. The coordinate-converted measurement data is applied to a Cartesian Kalman filter block 316, which forms and updates tracks based upon the flow of measurement data, to produce Cartesian states and covariance. More particularly, Cartesian Kalman filter 316 uses Kalman filtering techniques to smooth Cartesian X, Y, Z measurements into X, Y, Z, $X_{velocity}$, $Y_{velocity}$, $Z_{velocity}$ states. Propagation portions of the Kalman filter apply the effects of gravity to the states. The filtered Cartesian states and covariance data from block 316 are applied by way of path portion 315 to output path 223, to a centrifugal determination block 318, and to a target discrimination block 320. Block 318 uses the track data to estimate the centrifugal acceleration of the target(s). The centrifugal acceleration information is used inter alia for updating the range rate.

Range-state filter 312 of FIG. 3 receives the centrifugal acceleration information from block 318 together with the measurement data from path 221, and updates the filter range state. That is, range-state filter block 312 provides information about target range, target range rate, and target acceleration. The range-states provided by range-state filter 312 are provided to target discriminator block 320 and by way of a portion 313 of path 223 to the fire-control block 224 of FIG. 2. Thus, target discriminator block 320 of FIG. 3 receives the target range, target range rate, and target acceleration from block 312, and also receives the track state information from block 316. Discrimination block 320 produces object identification information. The object identification information from block 320 is coupled by path 225 to countermeasure fire control system 224 of FIG. 2. The target state and covariance information are applied from blocks 312 and 316 over portions 313 and 315 of path 223 to fire control system 224 of FIG. 2. Ultimately, this results in initiating interceptor missile (or other countermeasure) control for engaging the hostile missile.

SUMMARY OF THE INVENTION

A method according to an aspect of the invention is for generating target location and state to support trajectory coasting. (This technique is of particular interest because of its capability in improving range-state coasting.) The method comprises the steps of Cartesian-coordinate filtering range and angle information to thereby produce Cartesian-coordinate state information having a first quality. Range and Doppler information are filtered to produce filtered range state including range acceleration. The instantaneous perpendicular speed is determined from the range acceleration. Cartesian velocity is estimated from the instantaneous perpendicular speed and from the Cartesian-coordinate state information having a first quality, and combining the Cartesian-coordinate state information with the estimated Cartesian velocity to thereby produce Cartesian state information with a higher quality than the first quality. The estimated Cartesian velocity is propagated in time to thereby produce range acceleration information, and the range acceleration information is combined with the range state estimate to thereby produce target location and state. A particular mode of the method includes the further step of discriminating among targets by kinematic estimation. A further mode comprises the step of initiating countermeasures to the targets in response to the kinematic estimation.

A method for determining the location and velocity of a target in terms of range-state and Cartesian state according to an aspect of the invention comprises the steps of sensing the target with a radar, to thereby generate measurement data, and determining from the measurement data instantaneous range-state and covariance. The method also includes the step of estimating, from the instantaneous range-state and covariance, the instantaneous perpendicular speed of the target. The measurement data is converted into Cartesian coordinates to thereby produce measurement data in Cartesian coordinates. The measurement data in Cartesian coordinates is Kalman filtered to thereby produce filtered Cartesian states and covariance. The filtered Cartesian states and covariance are updated with the instantaneous perpendicular speed to thereby produce improved Cartesian states and improved covariance with improved target velocity. The improved Cartesian states and improved covariance are coasted at times when the measurement data is interrupted, or is of questionable quality, by the steps of:

propagating the improved Cartesian state and improved covariance, and "adding" the effects of gravity in Cartesian coordinates, or more specifically calculating the direction and effects of gravity in Cartesian coordinates;

calculating the contribution of gravity in the direction of the radar line-of-sight using the improved Cartesian state;

computing the centrifugal acceleration with respect to the range-state using the improved target velocity in Cartesian coordinates;

propagating the range-state; and adding the effects of gravity and centrifugal acceleration on the range-state as computed in the steps of calculating and computing, thereby generating range-state.

In a particular mode of the method for determining the location and velocity of a target, the step of computing the centrifugal acceleration (618) is performed according to $$\alpha = \frac{|\vec{v}_\perp|^2}{r}$$

where

α is the centrifugal acceleration;

$\vec{v}_\perp$ is the perpendicular Cartesian velocity vector; and r is the range.

In another particular mode of the method for determining the location and velocity of a target, the step of propagating the range-state (620) is performed by $$\begin{bmatrix} r \\ \dot{r} \end{bmatrix}_{k+1} = \begin{bmatrix} 1 & \Delta t \\ 0 & 1 \end{bmatrix} \begin{bmatrix} r \\ \dot{r} \end{bmatrix}_k$$

where Δt is the update interval

In yet another particular mode of the method for determining the location and velocity of a target, the step of adding the effects of gravity and centrifugal acceleration to the range-state (622) is performed by $$\begin{bmatrix} r \\ \dot{r} \end{bmatrix}_{k+1} = \begin{bmatrix} r \\ \dot{r} \end{bmatrix}_{k+1} + \begin{bmatrix} 0.5\alpha\Delta t^2 \\ \alpha\Delta t \end{bmatrix} + \begin{bmatrix} 0.5\tilde{g}\Delta t^2 \\ \tilde{g}\Delta t^2 \end{bmatrix}$$

where $\tilde{g}$ is the projection of gravity into the line-of-sight extending between the locations of the radar and the target; and the location of the target is computed by the Cartesian filter.

DESCRIPTION OF THE INVENTION

Coasting is defined as estimating the states of the target when measurements are not available. The ability to coast a target is dependent upon the last known state of the target. In the prior art arrangement of FIG. 3, the velocity, which is part of the Cartesian states produced by Kalman filter 316 of FIG. 3, is fundamentally limited in accuracy when measurements are sparse.

The prior art tracks a target in Cartesian-state as well as in range-state. Range-state is incomplete in describing the location of the target. However, the information that range-state provides is highly precise. The Cartesian-state is more complete, but measurement noise adversely affects its accuracy. In general, a method according to an aspect of the invention provides improved range-state coasting for ballistic targets using a limited set of radar observations or when the flow of radar observations is interrupted. In radar applications, range-state filtering converges very quickly because of the high precision of the range and Doppler data. Coasting in range-state models is or may be less satisfactory than desired because of the difficulty of predicting the effects of gravity in the direction of the range vector. Also, filtering in range-state is subject to the effects of centrifugal accelerations. The effect of gravity and centrifugal accelerations on a ballistic target in Cartesian coordinates is easy to model. The problem with the Cartesian model is that it converges much more slowly than the range-state filter because of the noisier measurements in cross-range (a direction transverse to the range direction). The method according to aspects of the invention takes advantage of the fast convergence of range filtering to "jump start" the Cartesian model. The improved state of the Cartesian model is used to predict gravity and centrifugal accelerations that influence the range states. Range-state coasting is improved with these effects taken into account.

Figure 4:
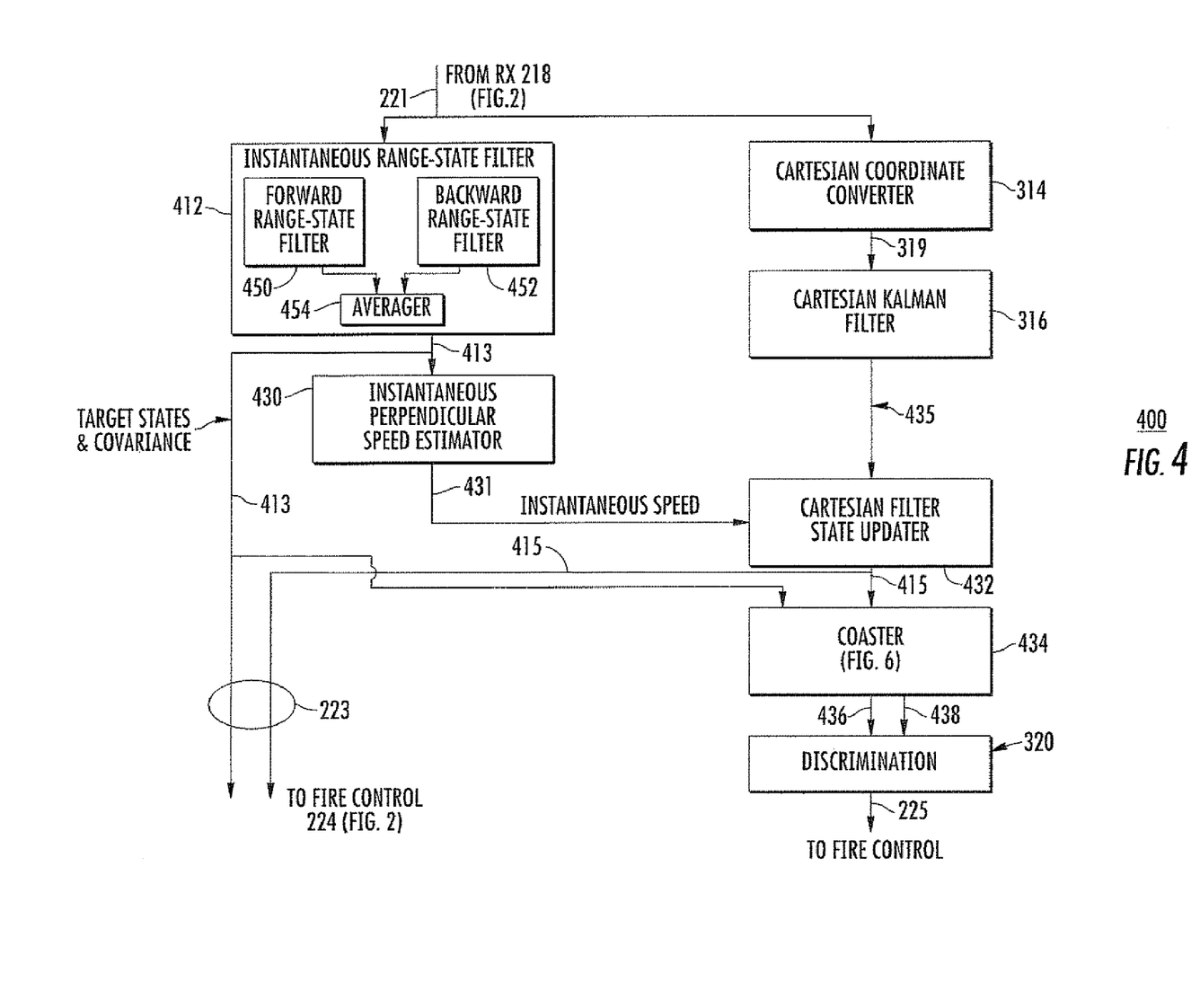
FIG. 4 is a simplified block diagram of radar processing according to an aspect of the invention which provides for "coasting" of the processing during intervals in which the measured data flow is degraded or interrupted.

Tracking processor 400 of FIG. 4 is generally similar to FIG. 3, but incorporates functions according to aspects of the invention. In block diagram 400 of FIG. 4, the received measurements are applied over path 221 in common to an instantaneous range-state filter 412 and to a Cartesian coordinate converter 314. Cartesian coordinate information produced by converter 314 is applied to a Cartesian Kalman filter 316. Cartesian coordinate converter 314 and Cartesian Kalman filter 316 are both essentially identical to those described in conjunction with FIG. 3. Instantaneous range-state filter 412 of FIG. 4 produces instantaneous range-state and covariance on a path 413 for application to an instantaneous perpendicular (⊥) speed estimator block 430 and (by way of path 223) to fire control 224 of FIG. 2. Perpendicular speed estimator block 430 computes the instantaneous perpendicular speed of the target at the instants established by block 412.

The converted and filtered target states and covariance are applied from block 316 over a path 435 to Cartesian filter state updater 432, together with the estimated instantaneous perpendicular speed from block 430. Cartesian filter state updater 432 of FIG. 4 takes the target states from the Cartesian Kalman filter 316 and the target states from instantaneous perpendicular speed estimator block 430 and updates or improves (jump-starts) the Cartesian filter states. More particularly, it reinitializes the Nth Cartesian velocity state $(X_{velocity}, Y_{velocity}, Z_{velocity})_N$ (where the subscript 'N' represents the Nth member of a sequence of 'K' measurements; 'N' is typically, thought not necessarily, the mid-point of the sequence) using the following update:

$$v_\perp = \sqrt{\frac{\ddot{r}_N - \hat{\vec{r}} \cdot \vec{g}}{r_N}} \text{ where,}$$

$$\hat{\vec{r}} = \frac{\begin{bmatrix} X \\ Y \\ Z \end{bmatrix}_N}{\left\| \begin{bmatrix} X \\ Y \\ Z \end{bmatrix}_N \right\|} \text{ and } \vec{g} \equiv \text{ gravity vector}$$

$$\hat{\vec{v}}_\perp = \frac{\left(I - \hat{\vec{r}}\hat{\vec{r}}^T\right) \begin{bmatrix} X_{velocity} \\ Y_{velocity} \\ Z_{velocity} \end{bmatrix}_N}{\left\| \left(I - \hat{\vec{r}}\hat{\vec{r}}^T\right) \begin{bmatrix} X_{velocity} \\ Y_{velocity} \\ Z_{velocity} \end{bmatrix}_N \right\|}$$

The Nth Cartesian velocity state is replaced with the improved Cartesian velocity state:

$$\begin{bmatrix} X_{velocity} \\ Y_{velocity} \\ Z_{velocity} \end{bmatrix}_{N,new} = \dot{r}_N \hat{\vec{r}} + v_\perp \hat{v}_\perp$$

In the above equations, $r_N$, $\dot{r}_N$, $\ddot{r}_N$ are range, range-rate, and range-acceleration, respectively. These are elements of range-state, the product of Block 412.

Figure 6:
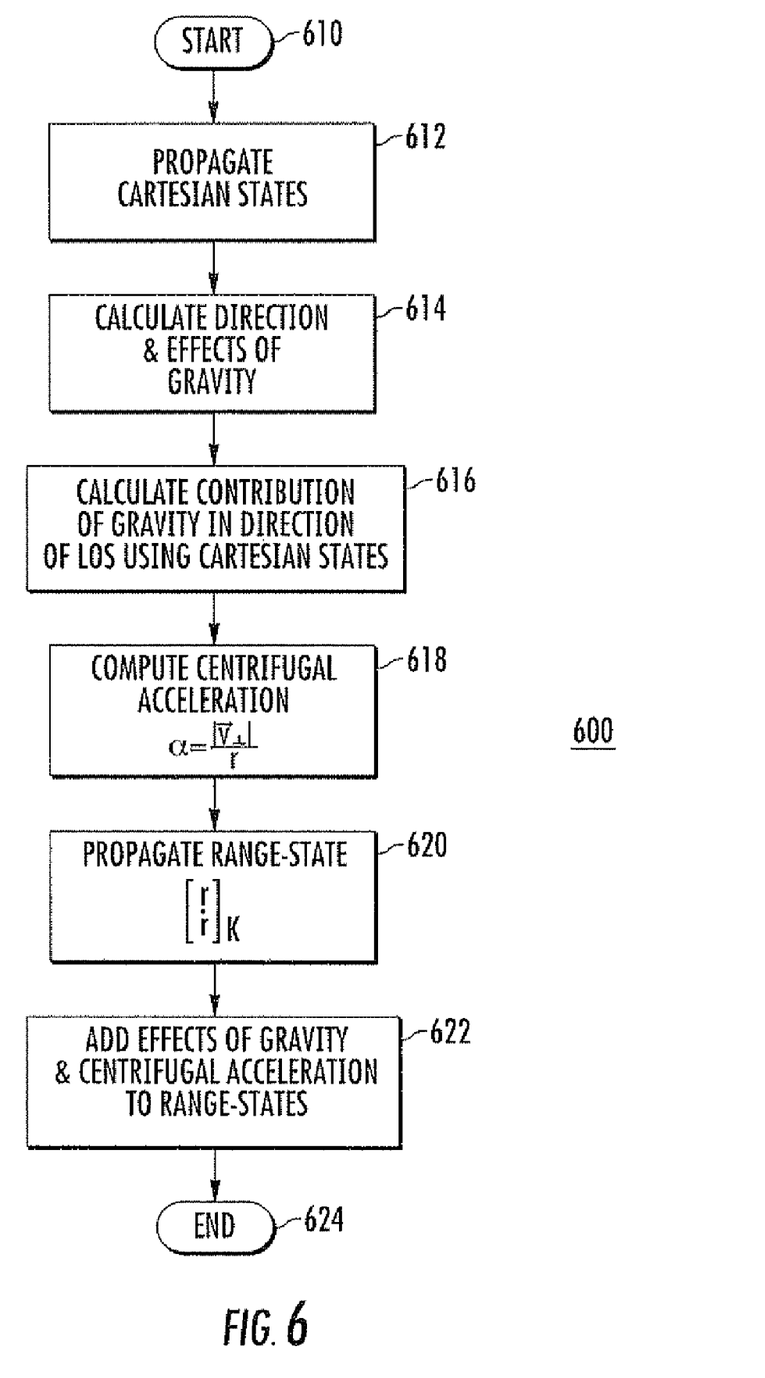
FIG. 6 is a logic or control flow chart or diagram illustrating steps of processing in the coasting function of FIG. 4.

The updated or improved Cartesian filter states are applied from Cartesian filter state updater 432 to a coasting or coaster block 434 and (by way of a path portion 415 of path 223) to fire control block 224 of FIG. 2. The Nth Cartesian state and range-state (range, range-rate) are the starting point of the coaster block 434. FIG. 6 is a simplified logic flow chart or diagram representing the steps performed in coaster block 434. In FIG. 6, the logic begins at a START block 610. For each increment in time, coaster block 434 of FIG. 4:

1) Propagates the improved Cartesian state(s) which it receives from Cartesian Filter State Updater block 432, as suggested by block 612 of FIG. 6. It also, for each update, calculates the direction and effect(s) of gravity, and adds those effect(s) of gravity in Cartesian coordinates to the propagated Cartesian state(s), as suggested by block 614;

2) Calculates the contribution of gravity in the direction of the radar line-of-sight (LOS) using the propagated Cartesian state(s), as suggested by block 616;
3) Computes the centrifugal acceleration with respect to the current propagated radar position or Cartesian state(s) according to $$\alpha = \frac{|\vec{v}_\perp|^2}{r}$$

where
$\alpha$ is the centrifugal acceleration;
$\vec{v}_\perp$ is the perpendicular Cartesian velocity vector
as suggested by block 618 of FIG. 6;
4) Propagates the range-state (received from block 412 of FIG. 4 by way of path 413) by $$\begin{bmatrix} r \\ \dot{r} \end{bmatrix}_{k+1} = \begin{bmatrix} 1 & \Delta t \\ 0 & 1 \end{bmatrix} \begin{bmatrix} r \\ \dot{r} \end{bmatrix}_k$$

where $\Delta t$ is the update interval
as suggested by block 620 of FIG. 6; and
5) Adds the effects of gravity and centrifugal acceleration to the range-state (as computed in steps 2) & 3) by computing $$\begin{bmatrix} r \\ \dot{r} \end{bmatrix}_{k+1} = \begin{bmatrix} r \\ \dot{r} \end{bmatrix}_{k+1} + \begin{bmatrix} 0.5\alpha\Delta t^2 \\ \alpha\Delta t \end{bmatrix} + \begin{bmatrix} 0.5\tilde{g}\Delta t^2 \\ \tilde{g}\Delta t \end{bmatrix}$$

where $\tilde{g}$ is the projection of gravity into the line-of-sight; the line-of-sight extends between the locations of the radar and the target; and
the location of the target is computed by the Cartesian filter.
as suggested by block 622 of FIG. 6.

Steps 1) through 5) are repeated for each coasting step. The output of coaster block 434 of FIG. 4 is applied over paths 436 and 438 to discriminator or discrimination block 320, already described in conjunction with FIG. 3.

Instantaneous range-state filter block 412 of FIG. 4 includes a forward range-state filter 450 and a backward range-state filter 452, both of which receive the received measurements from path 221. Forward range-state filter 450 is a filter that processes measurements 1 through N as a forward sequence (i.e. 1, 2, 3, . . . , N). Unlike Cartesian Kalman Filter 316, the effects of gravity are not modeled. Backward range-state filter 452 is a filter that processes measurements N through K in reverse sequence (i.e. K, K−1, K−2, . . . , N+1, N). As with the forward range-state filter 450, the effects of gravity are not modeled. The filtered outputs of blocks 450 and 452 are applied to an averager or integrator block 454. Averager block 454 of FIG. 4 takes a mean average of the results of blocks 450 and 452, to thereby produce target states and covariance for application to path 413, block 430, and block 434.

Figure 5:
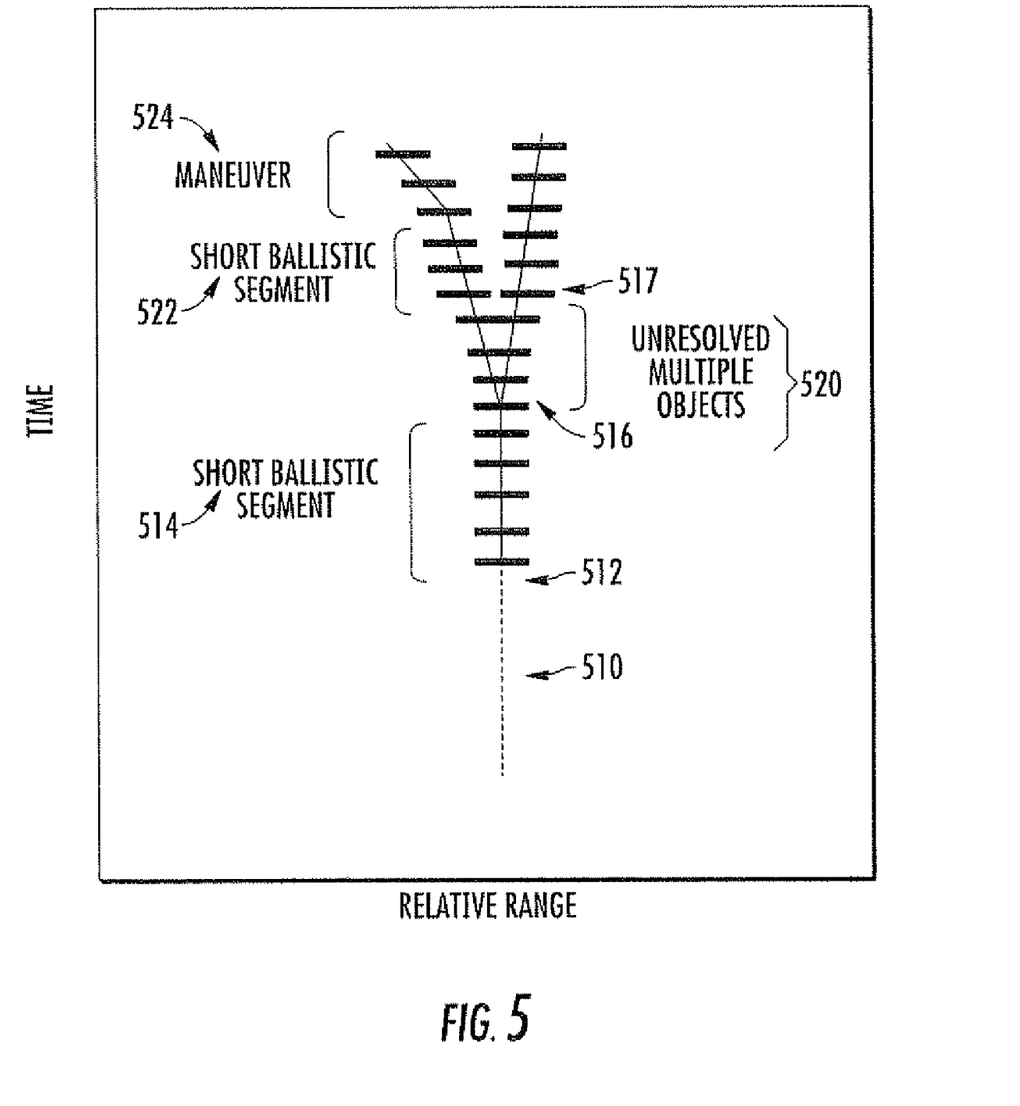
FIG. 5 is a notional simplified diagram representing relative range of a target versus time.

FIG. 5 is a notional simplified diagram representing relative range of a target versus time for the purpose of illustrating regions of algorithm applicability. In FIG. 5, dotted line 510 represents the range of the target (prior to detection) relative to a ballistic trajectory. At a point 512, the target is detected.

The cross-lines in region 514 represent the apparent length of the target. At a point 516, the target splits into two objects, which may be viewed as being a reentry vehicle and a decoy. In the region or time interval 520 between points 516 and 517, the two objects cannot be individually resolved. This lack of resolution distorts the true trajectories of the objects. The time during which the data is insufficient to resolve the targets corresponds to those times when coasting may be required. At time 517 the objects become resolvable. Time region 522 represents a short ballistic segment, with a lessening range with increasing time. The time illustrated as 524 represents an evasive maneuver. If the states of the targets were to be based upon a combination of data from times 522 and 524, then the actual state or location of the reentry vehicle might be incorrectly estimated. The most critical portion of the target state for the purpose of countermeasures is the velocity.

Application of the method of the invention improves kinematic estimation in the event of shorter track segments, such as track segment 522 of FIG. 5. Such short track segments may be caused by lack of data, the editing out or deleting of unresolved objects, and the editing out or deleting of track segments which include maneuvers, such as segment 524 of FIG. 5. This last may be viewed as being or including the localization and/or characterization of maneuver track segments.

A method according to an aspect of the invention is for generating target (18) location and state to support trajectory coasting (in region 520). The method comprises the steps of Cartesian-coordinate filtering (314, 316) range and angle information (from 218 by way of 221) to thereby produce Cartesian-coordinate state information (on path 435) having a first quality. Range and Doppler information are filtered (412) to produce filtered range state including range acceleration (on path 413). The instantaneous perpendicular speed is determined (430) from the range acceleration. Cartesian velocity is estimated (432) from the instantaneous perpendicular speed and from the Cartesian-coordinate state information having a first quality, and combining the Cartesian-coordinate state information with the estimated Cartesian velocity to thereby produce Cartesian state information with a higher quality than the first quality. The estimated Cartesian velocity is propagated in time (434) to thereby produce range acceleration information, and the range acceleration information is combined with the range state estimate to thereby produce target location and state (on paths 436 and 438). A particular mode of the method includes the further step of discriminating among targets by kinematic estimation. A further mode comprises the step of initiating countermeasures (226) to the targets in response to the kinematic estimation.

A method according to an aspect of the invention for determining the location and velocity of a target in terms of range-state and Cartesian state comprises the steps of sensing the target (18) with a radar (212), to thereby generate (218) measurement data, and determining (412) from the measurement data instantaneous range-state and covariance (on path 413). The method also includes the step of estimating, (430) from the instantaneous range-state and covariance, the instantaneous perpendicular speed of the target. The measurement data is converted into Cartesian coordinates (314) to thereby produce measurement data in Cartesian coordinates. The measurement data in Cartesian coordinates is Kalman filtered (316) to thereby produce filtered Cartesian states and covariance. The filtered Cartesian states and covariance are updated (432) with the instantaneous perpendicular speed to thereby produce improved Cartesian states and improved covariance with improved target velocity. The improved Cartesian states and improved covariance are coasted (434) at times when the measurement data is interrupted, or is of questionable quality, by the steps of:

propagating (612) the improved Cartesian state and improved covariance, and "adding" (614) to the improved Cartesian state the effects of gravity in Cartesian coordinates, or more specifically calculating the direction and effects of gravity on the improved Cartesian state;

calculating (616) the contribution of gravity in the direction of the radar line-of-sight using the improved Cartesian state;

computing (618) the centrifugal acceleration with respect to the range-state using the improved target velocity in Cartesian coordinates;

propagating (620) the range-state; and adding (622) the effects of gravity and centrifugal acceleration on the range-state as computed in the steps of calculating and computing, thereby generating range-state.

In a particular mode of the method for determining the location and velocity of a target, the step of computing the centrifugal acceleration (618) is performed according to $$\alpha = \frac{|\vec{v}_\perp|^2}{r}$$

where $\alpha$ is the centrifugal acceleration;

$\vec{v}_\perp$ is the perpendicular Cartesian velocity vector; and r is the range.

In another particular mode of the method for determining the location and velocity of a target, the step of propagating the range-state (620) is performed by $$\begin{bmatrix} r \\ \dot{r} \end{bmatrix}_{k+1} = \begin{bmatrix} 1 & \Delta t \\ 0 & 1 \end{bmatrix} \begin{bmatrix} r \\ \dot{r} \end{bmatrix}_k$$

where $\Delta t$ is the update interval

In yet another particular mode of the method for determining the location and velocity of a target, the step of adding the effects of gravity and centrifugal acceleration to the range-state (622) is performed by $$\begin{bmatrix} r \\ \dot{r} \end{bmatrix}_{k+1} = \begin{bmatrix} r \\ \dot{r} \end{bmatrix}_{k+1} + \begin{bmatrix} 0.5\alpha\Delta t^2 \\ \alpha\Delta t \end{bmatrix} + \begin{bmatrix} 0.5\tilde{g}\Delta t^2 \\ \tilde{g}\Delta t \end{bmatrix}$$

where $\tilde{g}$ is the projection of gravity into the line-of-sight extending between the locations of the radar and the target; and the location of the target is computed by the Cartesian filter.

What is claimed is:

1. A method for generating target location and state to support trajectory coasting, said method comprising the steps of:

Cartesian-coordinate filtering range and angle information associated with said target in a processor to produce Cartesian-coordinate state information having a first quality;

filtering range and Doppler information associated with said target to produce a filtered range state including range acceleration;

determining from said range acceleration an instantaneous perpendicular speed;

estimating, from said instantaneous perpendicular speed and said Cartesian-coordinate state information having a first quality, estimated Cartesian velocity, and combining said Cartesian-coordinate state information with said estimated Cartesian velocity to produce Cartesian state information with a higher quality than said first quality;

propagating said estimated Cartesian velocity in time to produce range acceleration information; and combining said range acceleration information with said range state estimate to produce target location and state.

2. A method according to claim 1, further comprising the step of discriminating among a plurality of targets by kinematic estimation.

3. A method according to claim 2, further comprising the step of initiating countermeasures to said targets in response to said kinematic estimation.

4. A method for determining the location and velocity of a target in terms of range-state and Cartesian state, said method comprising the steps of:

sensing the target with a radar, to generate measurement data;

determining from said measurement data instantaneous range-state and covariance;

estimating from said instantaneous range-state and covariance an instantaneous perpendicular speed of said target;

converting said measurement data in Cartesian coordinates to produce measurement data in Cartesian coordinates;

Kalman filtering said measurement data in Cartesian coordinates to produce filtered Cartesian states and covariance;

updating said filtered Cartesian states and covariance with said instantaneous perpendicular speed to produce improved Cartesian states and improved covariance with improved target velocity;

coasting said improved Cartesian states and improved covariance at times when said measurement data is interrupted by the steps of:

propagating the improved Cartesian state and improved covariance, and adding effects of gravity in Cartesian coordinates to the improved Cartesian state;

calculating a contribution of gravity in a direction of the radar line-of-sight using the improved Cartesian state;

computing a centrifugal acceleration with respect to the range-state using said improved target velocity in Cartesian coordinates;

propagating the range-state; and adding the contribution of gravity and centrifugal acceleration on the range-state as computed in said steps of calculating and computing.

5. A method according to claim 4, wherein said step of computing the centrifugal acceleration is performed according to $$\alpha = \frac{|\vec{v}_\perp|^2}{r}$$

where $\alpha$ is the centrifugal acceleration;

$\vec{v}_\perp$ is the perpendicular Cartesian velocity vector; and r is the range.

6. A method according to claim 4, wherein said step of propagating the range-state is performed by $$\begin{bmatrix} r \\ \dot{r} \end{bmatrix}_{k+1} = \begin{bmatrix} 1 & \Delta t \\ 0 & 1 \end{bmatrix} \begin{bmatrix} r \\ \dot{r} \end{bmatrix}_k$$

where $\Delta t$ is the update interval; and r is the range.

7. A method according to claim 4, wherein said step of adding the contribution of gravity and centrifugal acceleration to the range-state is performed by $$\begin{bmatrix} r \\ \dot{r} \end{bmatrix}_{k+1} = \begin{bmatrix} r \\ \dot{r} \end{bmatrix}_{k+1} + \begin{bmatrix} 0.5\alpha\Delta t^2 \\ \alpha\Delta t \end{bmatrix} + \begin{bmatrix} 0.5\tilde{g}\Delta t^2 \\ \tilde{g}\Delta t \end{bmatrix}$$

where $\tilde{g}$ is the projection of gravity into the line-of-sight extending between the locations of the radar and the target; $\alpha$ is the centrifugal acceleration; $\Delta t$ is the update interval; r is the range; and the location of the target is computed by the Cartesian filter.

8. A method according to claim 4, further comprising the step of applying said range-state to initiate countermeasures to said target.

9. A system for generating target location and state to support trajectory coasting, said system comprising:

a processor executing instructions for performing the steps of:

Cartesian-coordinate-filtering range and angle information associated with said target to produce Cartesian-coordinate state information having a first quality;

filtering range and Doppler information associated with said target to produce a filtered range state including range acceleration;

determining from said range acceleration an instantaneous perpendicular speed;

estimating, from said instantaneous perpendicular speed and said Cartesian-coordinate state information with said estimated Cartesian velocity to produce Cartesian state information with a higher quality than said first quality;

propagating said estimated Cartesian velocity in time to produce range acceleration information, and combining said range acceleration information with said range state estimate to thereby produce target location and state.

10. A system according to claim 9, further comprising the step of discriminating among a plurality of targets by kinematic estimation.

11. A system according to claim 10, further comprising the step of initiating countermeasures to said targets in response to said kinematic estimation.

12. A method for determining the location and velocity of a target in terms of range-state and Cartesian state, said method comprising the steps of:

sensing the target with a radar, to generate measurement data;

determining from said measurement data instantaneous range-state and covariance;

estimating from said instantaneous range-state and covariance an instantaneous perpendicular speed of said target;

converting said measurement data into Cartesian coordinates to produce measurement data in Cartesian coordinates;

Kalman filtering said measurement data in Cartesian coordinates to produce filtered Cartesian states and covariance;

updating said filtered Cartesian states and covariance with said instantaneous perpendicular speed to thereby produce improved Cartesian states and improved covariance with improved target velocity;

coasting said improved Cartesian states and improved covariance at times when said measurement data is interrupted, by the steps of:

propagating the improved Cartesian state and improved covariance, and adding the effects of gravity in Cartesian coordinates to the improved Cartesian state;

calculating a contribution of gravity in a direction of the radar line-of-sight using the improved Cartesian state;

computing a centrifugal acceleration with respect to the range-state using said improved target velocity in Cartesian coordinates;

propagating the range-state; and adding the contribution of gravity and centrifugal acceleration on the range-state as computed in said steps of calculating and computing.

13. A method according to claim 12, wherein said step of computing the centrifugal acceleration is performed according to $$\alpha = \frac{|\vec{v}_\perp|^2}{r}$$

where $\alpha$ is the centrifugal acceleration;

$\vec{v}_\perp$ is the perpendicular Cartesian velocity vector; and r is the range.

14. A method according to claim 12, wherein said step of propagating the range-state is performed by $$\begin{bmatrix} r \\ \dot{r} \end{bmatrix}_{k+1} = \begin{bmatrix} 1 & \Delta t \\ 0 & 1 \end{bmatrix} \begin{bmatrix} r \\ \dot{r} \end{bmatrix}_k$$

where $\Delta t$ is the update interval; and r is the range.

15. A method according to claim 12, wherein said step of adding the contribution of gravity and centrifugal acceleration to the range-state is performed by $$\begin{bmatrix} r \\ \dot{r} \end{bmatrix}_{k+1} = \begin{bmatrix} r \\ \dot{r} \end{bmatrix}_{k+1} + \begin{bmatrix} 0.5\alpha\Delta t^2 \\ \alpha\Delta t \end{bmatrix} + \begin{bmatrix} 0.5\tilde{g}\Delta t^2 \\ \tilde{g}\Delta t \end{bmatrix}$$

where $\tilde{g}$ is the projection of gravity into the line-of-sight extending between the locations of the radar and the target; $\alpha$ is the centrifugal acceleration; $\Delta t$ is the update interval; r is the range; and the location of the target is computed by the Cartesian filter.

16. A method according to claim 12, further comprising the step of applying said range-state to initiate countermeasures to said target.

* * * * *